United States Patent
Mehrotra et al.

(10) Patent No.: US 8,553,540 B2
(45) Date of Patent: Oct. 8, 2013

(54) CONGESTION CONTROL FOR DELAY SENSITIVE APPLICATIONS

(75) Inventors: Sanjeev Mehrotra, Kirkland, WA (US); Tong L. Wynn, Redmond, WA (US); Jin Li, Sammamish, WA (US); Sudipta Sengupta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 504 days.

(21) Appl. No.: 12/762,016

(22) Filed: Apr. 16, 2010

(65) Prior Publication Data

US 2011/0216648 A1    Sep. 8, 2011

(51) Int. Cl.
*H04L 12/26* (2006.01)

(52) U.S. Cl.
USPC ............ 370/230; 370/235; 370/252; 370/412

(58) Field of Classification Search
None
See application file for complete search history.

(56) References Cited

U.S. PATENT DOCUMENTS

| | | | |
|---|---|---|---|
| 5,699,369 A | 12/1997 | Guha | |
| 6,421,387 B1 | 7/2002 | Rhee | |
| 6,574,668 B1 | 6/2003 | Gubbi et al. | |
| 7,149,664 B1 * | 12/2006 | Firoiu et al. | 703/2 |
| 7,336,611 B1 | 2/2008 | Aweya et al. | |
| 7,372,814 B1 * | 5/2008 | Chiruvolu et al. | 370/235 |
| 7,447,148 B2 | 11/2008 | Gao et al. | |
| 7,512,066 B2 | 3/2009 | Santos et al. | |
| 2005/0025052 A1 * | 2/2005 | Zhao et al. | 370/230 |
| 2005/0068894 A1 * | 3/2005 | Yu et al. | 370/235 |
| 2005/0144303 A1 | 6/2005 | Zhang et al. | |
| 2006/0015639 A1 | 1/2006 | Taylor | |
| 2009/0006920 A1 | 1/2009 | Munson et al. | |
| 2009/0177793 A1 | 7/2009 | Josa et al. | |

OTHER PUBLICATIONS

"Hybrid Window and Rate Based Congestion Control for Delay Sensitive Applications", Paper ID 1729, ICME, 2010, 6 pages.
Amir et al., "A Low Latency, Loss Tolerant Architecture and Protocol for Wide Area Group Communication", Proceedings International Conference on Dependable Systems and Networks, New York, NY, USA, Jun. 25-28, 2000, 10 pages.
Brakmo et al., "TCP Vegas: New Techniques for Congestion Detection and Avoidance", ACM SIGCOMM Computer Communication Review, Oct. 1994, 24(4), 12 pages.
Chiu et al., "Analysis of the Increase/Decrease Algorithms for Congestion Avoidance in Computer Networks", Computer Networks and ISDN Systems, Jun. 10, 1989, 17(1), 1-14.

(Continued)

*Primary Examiner* — Chi Pham
*Assistant Examiner* — Shick Hom
(74) *Attorney, Agent, or Firm* — Merchant & Gould P.C.

(57) ABSTRACT

In various embodiments, methods and systems are disclosed for a hybrid rate plus window based congestion protocol that controls the rate of packet transmission into the network and provides low queuing delay, practically zero packet loss, fair allocation of network resources amongst multiple flows, and full link utilization. In one embodiment, a congestion window may be used to control the maximum number of outstanding bits, a transmission rate may be used to control the rate of packets entering the network (packet pacing), a queuing delay based rate update may be used to control queuing delay within tolerated bounds and minimize packet loss, and aggressive ramp-up/graceful back-off may be used to fully utilize the link capacity and additive-increase, multiplicative-decrease (AIMD) rate control may be used to provide fairness amongst multiple flows.

19 Claims, 10 Drawing Sheets

(56) References Cited

OTHER PUBLICATIONS

Choi et al., "Designing TCP-friendly Window-based Congestion Control for Real-time Multimedia Applications", May 2009, 6 pages.

Floyd et al., "The NewReno Modification to TCP's Fast Recovery Algorithm", IETF, Nov. 2003, 1-4.

Habib et al., "Taking Advantage of Multihoming with Session Layer Striping", 25th IEEE International Conference on Computer Communications, Barcelona, Apr. 23-29, 2006, 6 pages.

Jain, "End-to-end available Bandwidth: Measurement Methodology, Dynamics, and Relation with TCP Throughput", Constantinos Dovrolis, 2002, 1-22.

Jin et al., "FAST TCP: Motivation, Architecture, Algorithms, Performance", IEEE/ACM Transactions on Networking, Dec. 2006, 14(6), 12 pages.

Kelly et al., "Rate Control for Communication Networks: Shadow Prices, Proportional Fairness, and Stability", Proceedings of the 6th ACM international symposium on Mobile ad hoc networking and computing, Mar. 1998, 49(3), 3 pages.

Liu et al., "TCP-Illinois: A Loss and Delay-based Congestion Control Algorithm for High-speed Networks", Performance Evaluation, Jun. 2008, 65(6-7), 13 pages.

Pathmasuntharam et al., "A Flow Control Framework for Improving Throughput and Energy Efficiency in CSMA/CA based Wireless Multihop Networks", IEEE, Proceedings of the 2006 International Symposium on a World of Wireless, Mobile and Multimedia Networks (WoWMoM'06), Buffalo, New York, Jun. 26-29, 2006, 7 pages.

Rubenstein et al., "Real-Time Reliable Multicast Using Proactive Forward Error Correction", Technical Report 98-19, Department of Computer Science, University of Massachusetts, Mar. 1998, 1-32.

Santos et al., "End-to-end Congestion Control for System Area Networks", Internet Systems and Storage Laboratory, HP Laboratories Palo Alto, May 13, 2002, 25 pages.

Tan et al., "A Compound TCP Approach for High-speed and Long Distance Networks", 25th IEEE International Conference on Computer Communications, Barcelona, Spain, Apr. 2006, 12 pages.

Turner et al., "An Approach for Congestion Control in Infiniband", Internet Systems and Storage Laboratory, HP Laboratories Palo Alto, May 14, 2002, 19 pages.

\* cited by examiner

CONGESTION CONTROL FOR DELAY SENSITIVE APPLICATIONS

CROSS-REFERENCE TO RELATED APPLICATIONS

This application is a continuation-in-part of U.S. application Ser. No. 12/718,537, filed Mar. 5, 2010, the entire contents of which are hereby incorporated by reference in their entirety.

BACKGROUND

In addition to popular applications such as voice over IP (VoIP) and video conferencing, there has been a rapid increase in interactive cloud based software applications. Compared to traditional real-time media (VoIP/conferencing) and file delivery, interactive applications exhibit a number of unique characteristics: 1) they are delay sensitive and yet demand in-order and reliable data delivery, and 2) the data traffic is typically bursty. Traditional window-based congestion control does not work well for interactive applications because the bursty arrival of data leads to bursty network traffic, causing additional queuing delay and packet loss in the network which affect the performance of the interactive application.

Latency, congestion, and data loss may result in delays that negatively impact real time end user experience in delay sensitive applications such as interactive media (e.g., VOIP, remote desktop, and videoconferencing). Such delay sensitive applications typically require low queuing delay and practically zero packet loss. The queuing delay and packet loss required by these applications is usually much less than that provided by existing congestion control protocols such as TCP-like congestion control (as well as TCP variants) or even TCP-friendly rate control (TFRC). Even TFRC gives queuing delay and packet loss similar to TCP-like congestion control, the only difference being that it reduces the oscillatory behavior of TCP-like congestion control.

SUMMARY

In various embodiments, methods and systems are disclosed for a hybrid rate plus window-based congestion protocol that controls the rate of packet transmission into the network and provides low queuing delay, low packet loss, fair allocation of network resources amongst multiple flows, and high link utilization. In one embodiment, a congestion window may be used to control the maximum number of outstanding bits, a transmission rate may be used to control the rate of packets entering the network (packet pacing), a queuing delay based rate update may be used to control queuing delay within tolerated bounds and minimize any packet loss, aggressive ramp-up/graceful back-off may be used to fully utilize the link capacity, and additive-increase, multiplicative-decrease (AIMD) rate control may be used to provide fairness amongst multiple flows.

BRIEF DESCRIPTION OF THE DRAWINGS

The systems, methods, and computer readable media for altering a view perspective within a virtual environment in accordance with this specification are further described with reference to the accompanying drawings in which.

DETAILED DESCRIPTION

Computing Environments in General Terms

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

Figure 1:
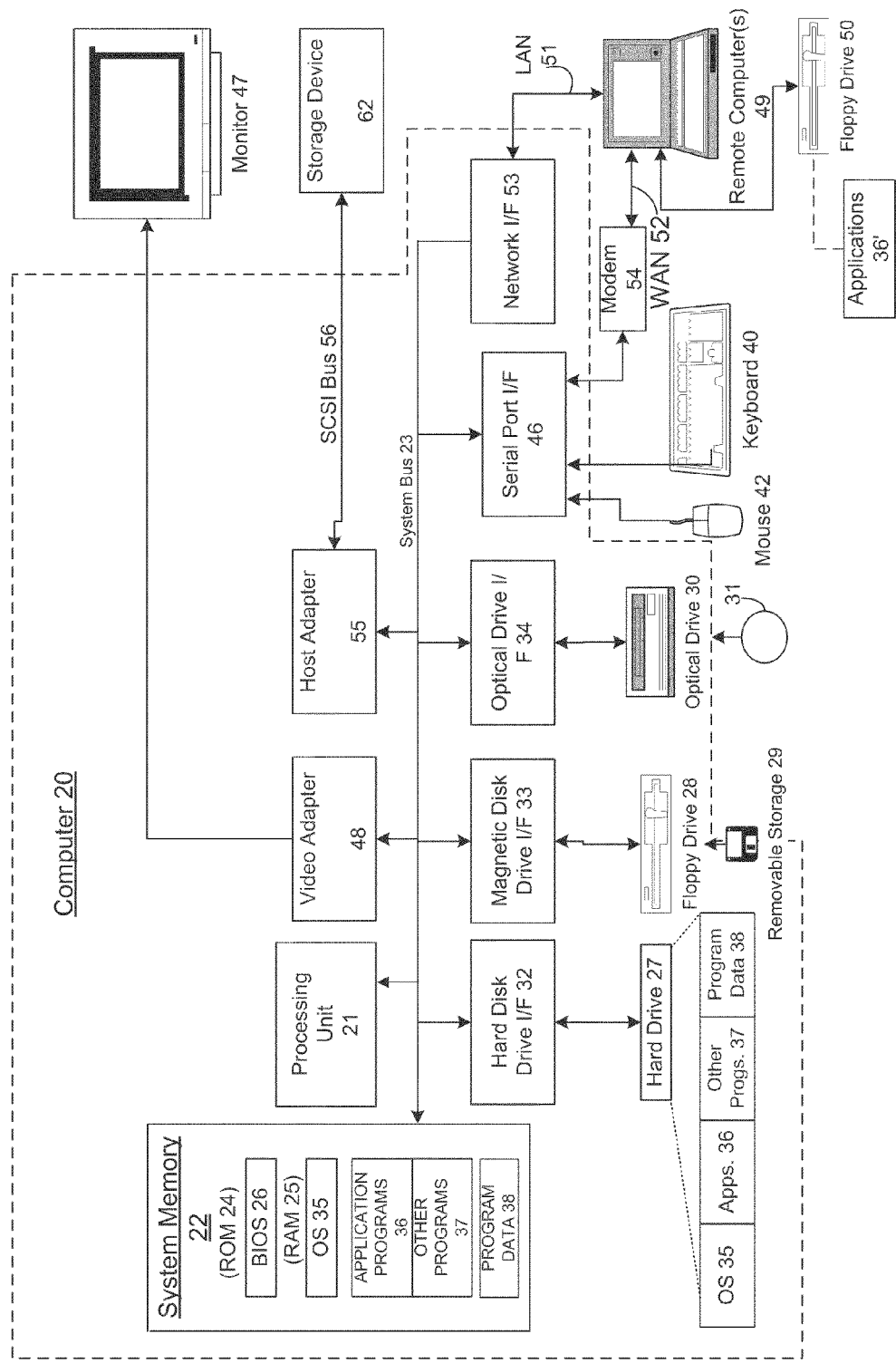
FIG. 1 depicts an example computer system wherein aspects of the present disclosure can be implemented.

Embodiments may execute on one or more computers. FIG. 1 and the following discussion are intended to provide a brief general description of a suitable computing environment in which the disclosure may be implemented. One skilled in the art can appreciate that computer systems 200, 300 can have some or all of the components described with respect to computer 20 of FIG. 1.

The term circuitry used throughout the disclosure can include hardware components such as hardware interrupt controllers, hard drives, network adaptors, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is trivial and left to an implementer.

FIG. 1 depicts an example of a computing system which is configured to incorporate aspects of the disclosure. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the disclosure are particularly well-suited for computer systems, nothing in this document is intended to limit the disclosure to such embodiments.

Computer system 20 can include a logical processor, e.g., an execution core. In other embodiments computer system 20 may have multiple logical processors, e.g., multiple execution cores per processor substrate and/or multiple processor substrates that could each have multiple execution cores.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client computer system. The client computer system presents the output data. Thus, input is received and output presented at the client computer system, while processing actually occurs at the terminal server. A session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. It should be understood that the foregoing discussion is exemplary and that the presently disclosed subject matter may be implemented in various client/server environments and not limited to a particular terminal services product.

In most, if not all remote desktop environments, input data (entered at a client computer system) typically includes mouse and keyboard data representing commands to an application and output data (generated by an application at the terminal server) typically includes video data for display on a video output device. Many remote desktop environments also include functionality that extend to transfer other types of data.

Communications channels can be used to extend the RDP protocol by allowing plug-ins to transfer data over an RDP connection. Many such extensions exist. Features such as printer redirection, clipboard redirection, port redirection, etc., use communications channel technology. Thus, in addition to input and output data, there may be many communications channels that need to transfer data. Accordingly, there may be occasional requests to transfer output data and one or more channel requests to transfer other data contending for available network bandwidth.

Figure 2:
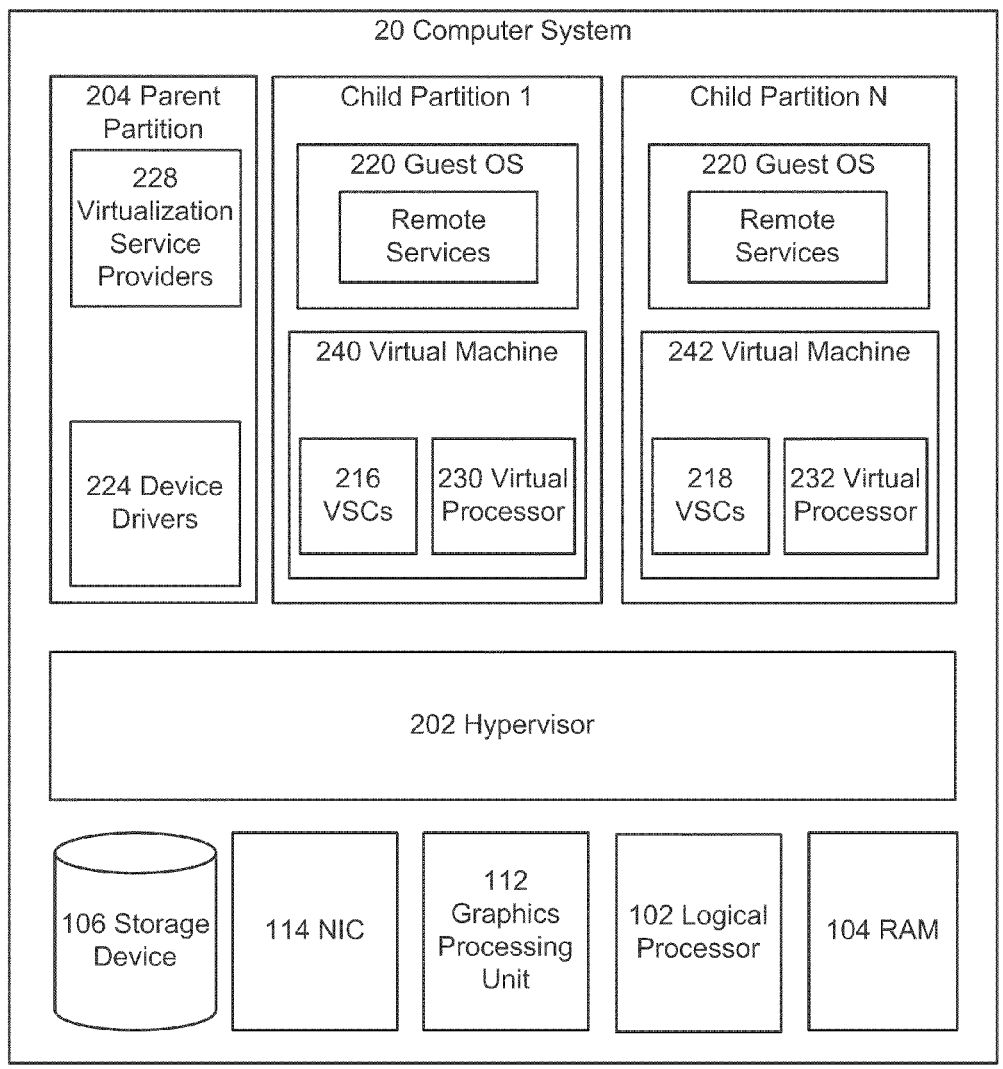
FIG. 2 depicts an operational environment for practicing aspects of the present disclosure.
Figure 3:
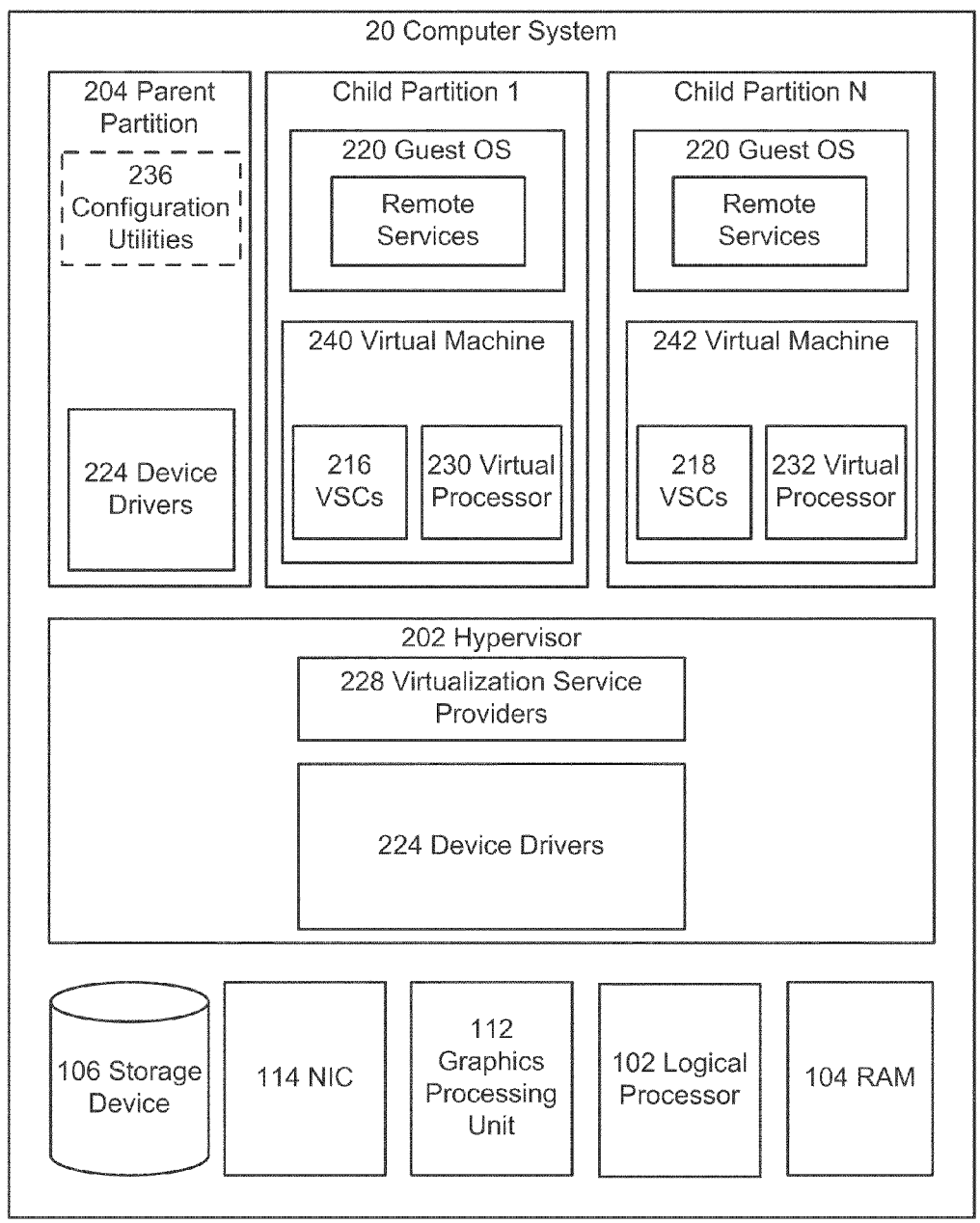
FIG. 3 depicts an operational environment for practicing aspects of the present disclosure.

Referring now to FIGS. 2 and 3, depicted are high level block diagrams of computer systems configured to effectuate virtual machines. As shown in the figures, computer system 20 can include elements described in FIG. 1 and components operable to effectuate virtual machines. One such component is a hypervisor 202 that may also be referred to in the art as a virtual machine monitor. The hypervisor 202 in the depicted embodiment can be configured to control and arbitrate access to the hardware of computer system 20. Broadly stated, the hypervisor 202 can generate execution environments called partitions such as child partition 1 through child partition N (where N is an integer greater than or equal to 1). In embodiments a child partition can be considered the basic unit of isolation supported by the hypervisor 202, that is, each child partition can be mapped to a set of hardware resources, e.g., memory, devices, logical processor cycles, etc., that is under control of the hypervisor 202 and/or the parent partition and hypervisor 202 can isolate one partition from accessing another partition's resources. In embodiments the hypervisor 202 can be a stand-alone software product, a part of an operating system, embedded within firmware of the motherboard, specialized integrated circuits, or a combination thereof.

In the above example, computer system 20 includes a parent partition 204 that can also be thought of as domain 0 in the open source community. Parent partition 204 can be configured to provide resources to guest operating systems executing in child partitions 1-N by using virtualization service providers 228 (VSPs) that are also known as back-end drivers in the open source community. In this example architecture the parent partition 204 can gate access to the underlying hardware. The VSPs 228 can be used to multiplex the interfaces to the hardware resources by way of virtualization service clients (VSCs) that are also known as front-end drivers in the open source community. Each child partition can include one or more virtual processors such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions. Generally speaking, and as illustrated by the figures, the combination of virtual processors, various VSCs, and memory in a partition can be considered a virtual machine such as virtual machine 240 or 242.

Generally, guest operating systems 220 through 222 can include any operating system such as, for example, operating systems from Microsoft®, Apple®, the open source community, etc. The guest operating systems can include user/kernel modes of operation and can have kernels that can include schedulers, memory managers, etc. A kernel mode can include an execution mode in a logical processor that grants access to at least privileged processor instructions. Each guest operating system 220 through 222 can have associated file systems that can have applications stored thereon such as terminal servers, e-commerce servers, email servers, etc., and the guest operating systems themselves. The guest operating systems 220-222 can schedule threads to execute on the virtual processors 230-232 and instances of such applications can be effectuated.

Referring now to FIG. 3, illustrated is an alternative architecture that can be used to effectuate virtual machines. FIG. 3 depicts similar components to those of FIG. 2, however in this example embodiment the hypervisor 202 can include the virtualization service providers 228 and device drivers 224, and parent partition 204 may contain configuration utilities 236. In this architecture, hypervisor 202 can perform the same or similar functions as the hypervisor 202 of FIG. 2. The hypervisor 202 of FIG. 3 can be a stand alone software product, a part of an operating system, embedded within firmware of the motherboard or a portion of hypervisor 202 can be effectuated by specialized integrated circuits. In this example parent partition 204 may have instructions that can be used to configure hypervisor 202 however hardware access requests may be handled by hypervisor 202 instead of being passed to parent partition 204.

Figure 4:
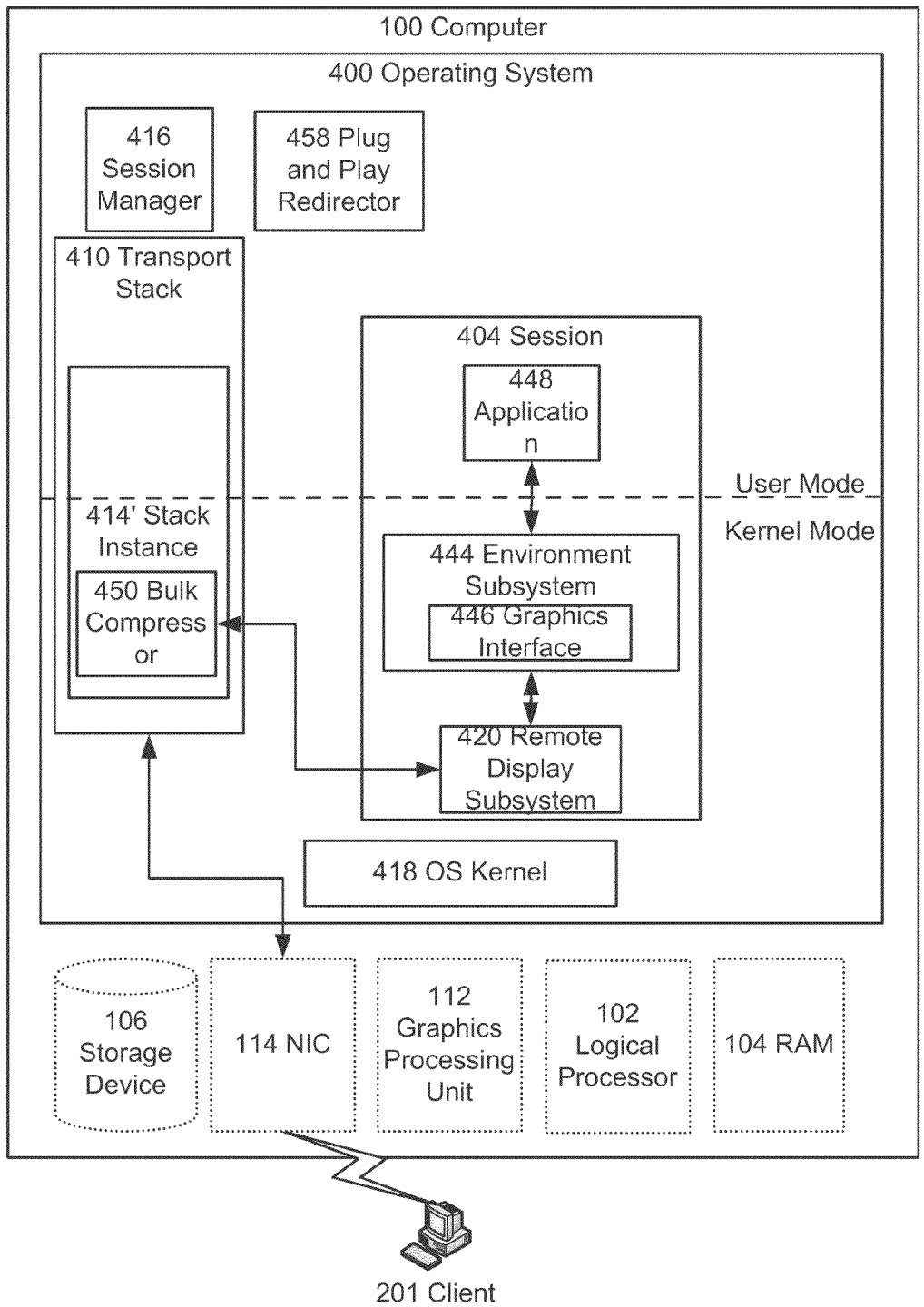
FIG. 4 illustrates a computer system including circuitry for effectuating remote desktop services.

Referring now to FIG. 4, computer 20 may include circuitry configured to provide remote desktop services to connecting clients. In an example embodiment, the depicted operating system 400 may execute directly on the hardware or a guest operating system 220 or 222 may be effectuated by a virtual machine such as VM 216 or VM 218. The underlying hardware 208, 210, 234, 212, and 214 is indicated in the illustrated type of dashed lines to identify that the hardware can be virtualized.

Remote services can be provided to at least one client such as client 401 (while one client is depicted remote services can be provided to more clients.) The example client 401 can include a computer terminal that is effectuated by hardware configured to direct user input to a remote server session and display user interface information generated by the session. In another embodiment, client 401 can be effectuated by a computer that includes similar elements as those of computer 100 FIG. 1b. In this embodiment, client 401 can include circuitry configured to effect operating systems and circuitry configured to emulate the functionality of terminals, e.g., a remote desktop client application that can be executed by one or more logical processors 102. One skilled in the art can appreciate that the circuitry configured to effectuate the operating system can also include circuitry configured to emulate a terminal.

Each connecting client can have a session (such as session 404) which allows the client to access data and applications stored on computer 100. Generally, applications and certain operating system components can be loaded into a region of memory assigned to a session. Thus, in certain instances some OS components can be spawned N times (where N represents the number of current sessions). These various OS components can request services from the operating system kernel 418 which can, for example, manage memory; facilitate disk reads/writes; and configure threads from each session to execute on the logical processor 102. Some example subsystems that can be loaded into session space can include the subsystems that generates desktop environments, the subsystems that track mouse movement within the desktop, the subsystems that translate mouse clicks on icons into commands that effectuate an instance of a program, etc. The processes that effectuate these services, e.g., tracking mouse movement, are tagged with an identifier associated with the session and are loaded into a region of memory that is allocated to the session.

A session can be generated by a session manager 416, e.g., a process. For example, the session manager 416 can initialize and manage each remote session by generating a session identifier for a session space; assigning memory to the session space; and generating system environment variables and instances of subsystem processes in memory assigned to the session space. The session manager 416 can be invoked when a request for a remote desktop session is received by the operating system 400.

A connection request can first be handled by a transport stack 410, e.g., a remote desktop protocol (RDP) stack. The transport stack 410 instructions can configure logical processor 102 to listen for connection messages on a certain port and forward them to the session manager 416. When sessions are generated the transport stack 410 can instantiate a remote desktop protocol stack instance for each session. Stack instance 414 is an example stack instance that can be generated for session 404. Generally, each remote desktop protocol stack instance can be configured to route output to an associated client and route client input to an environment subsystem 444 for the appropriate remote session.

As shown by the figure, in an embodiment an application 448 (while one is shown others can also execute) can execute and generate an array of bits. The array can be processed by a graphics interface 446 which in turn can render bitmaps, e.g., arrays of pixel values, that can be stored in memory. As shown by the figure, a remote display subsystem 420 can be instantiated which can capture rendering calls and send the calls over the network to client 401 via the stack instance 414 for the session.

In addition to remoting graphics and audio, a plug and play redirector 458 can also be instantiated in order to remote diverse devices such as printers, mp3 players, client file systems, CD ROM drives, etc. The plug and play redirector 458 can receive information from a client side component which identifies the peripheral devices coupled to the client 401. The plug and play redirector 458 can then configure the operating system 400 to load redirecting device drivers for the peripheral devices of the client 401. The redirecting device drivers can receive calls from the operating system 400 to access the peripherals and send the calls over the network to the client 401.

As discussed above, clients may use a protocol for providing remote presentation services such as Remote Desktop Protocol (RDP) to connect to a resource using terminal services. When a remote desktop client connects to a terminal server via a terminal server gateway, the gateway may open a socket connection with the terminal server and redirect client traffic on the remote presentation port or a port dedicated to remote access services. The gateway may also perform certain gateway specific exchanges with the client using a terminal server gateway protocol transmitted over HTTPS.

All of these variations for implementing the above mentioned partitions are just exemplary implementations, and nothing herein should be interpreted as limiting the disclosure to any particular virtualization aspect.

Congestion Control

Online interactive software applications are flourishing. For example, most web pages are no longer static and require constant interaction with the user (e.g., web-based e-mail, financial websites). Another example is video games with online features such as World of Warcraft and Final Fantasy XI. A further example is software as a service (SAAS) such as Google Apps and Microsoft Office Web Apps, where massive scalable IT-enabled capabilities are delivered to external customers.

One crucial feature that affects the user experience of an interactive application is its responsiveness. As an example, consider a cloud computing application where a thin client is used for display and input (keyboard/mouse) purposes and the server is located in a distant data center. The server processes the incoming commands and the application responds by providing a screen update sent to the client. The responsiveness of the application is directly related to the timely interchange of the client request and the server response. Thus, for delay sensitive applications it is essential that network packet loss and queuing delay be minimized.

Since most interactive applications operate as a state machine, the data must be delivered losslessly and in-order so that the client and server state are in sync. Therefore most existing applications simply use TCP for transmission, commonly using TCP Reno/New Reno. However, since TCP's congestion control algorithm increases the transmission rate (window size) until it observes packet loss, in congested cases (where the burst sending rate of the application is larger than the available bandwidth), the use of TCP will result in packet loss and large queuing delay. Since packet loss may result in retransmission (even with FEC), both of these can lead to poor delay performance for applications which require interactivity.

Delay based TCP congestion control, such as TCP Vegas, uses delay as an early indicator of congestion to minimize congestion induced packet loss and queuing delay. However, for bursty traffic in interactive applications, TCP Vegas may still result in queuing delays higher than desired. TCP congestion control is window based, meaning that it specifies the maximum number of bytes (or bits) that can be outstanding (the window size). For full link utilization, the window should be equal to the flow's share of bandwidth times the round trip time (RTT) (the bandwidth-delay product (BDP)). Accordingly, although the average sending rate is close to the bandwidth, the instantaneous sending rate can be much higher since an entire window of data can be pushed out at once. Thus for bursty traffic arrival, some packets can suffer a significant queuing delay and/or packet loss.

One simple way to obtain queuing delays lower than RTT is to ensure that the instantaneous sending rate is close to or below the actual available bandwidth so that queuing delay does not build up. This can be done by pacing the packets rather than allowing the full window of packets to go out at once. However, once the congestion control protocol is modified to prevent large queuing delays via pacing, then it can suffer from the issue of link under-utilization. It is well known that if TCP New Reno is used on high bandwidth-delay product (BDP) networks, then if the buffers are smaller than BDP, the link is not fully utilized. The basic reason for this is that the congestion detection threshold—which for TCP New Reno is the buffer size since only loss implies congestion—is smaller than the BDP.

In various methods and systems disclosed herein, a protocol is disclosed that provides low queuing delay, low packet loss, fair allocation of network resources amongst multiple flows, and efficient link utilization. The protocol may use one or more of: a congestion window to control the maximum number of outstanding bits, a transmission rate to control the rate of packets entering the network (packet pacing), a queuing delay based rate update to control queuing delay within tolerated bounds (and minimize any packet loss), aggressive ramp-up/graceful back-off to fully utilize the link capacity, and additive-increase, multiplicative-decrease (AIMD) rate control to provide fairness amongst multiple flows.

In remote desktop scenarios the graphics content of a user's desktop located on a host computer (e.g., the server) is typically streamed to another computer (e.g., the client). The server and the client will exchange the desktop graphics data in a well defined protocol or format. Microsoft's™ Remote Desktop Protocol (RDP) is an example of such a protocol. The RDP protocol is a stream oriented application-layer protocol that may use a stream based transport-layer protocol such as the Transmission Control Protocol (TCP) for exchanging data with the client. In the following discussion, "application latency" or "application delay" for a portion of the stream is defined as the latency experienced by the application-layer protocol in receiving that portion of the stream. This can be defined to be the time difference between when the application wishes to send the portion to when the receiving application receives that portion. "Transmission latency" is defined as the latency experienced by individual packets sent by the transport protocol. "Transmission loss", "loss", or "loss rate" refers to the probability of that packets sent by the transport protocol will be lost. Protocols such as the TCP protocol typically exhibit high application latency when the underlying transport is a wide area network (WAN) connection with high transmission latency and loss. If such a link is used in delay sensitive applications such as interactive media (e.g., VOIP, remote desktop, videoconferencing), such application latencies may result in a negative user experience because the desktop graphics data may be delivered to the client in a time delayed fashion.

In one embodiment, rate-based congestion control (rate control) is added to classical window based schemes to pace data packets. Pacing data packets on top of a window based congestion control protocol may provide low queuing delay and near zero packet loss (even if the traffic from the application is bursty in nature). This may prevent the instantaneous queuing delay from becoming large. In another embodiment, window-based congestion control may be added to a rate-based rate-control scheme to prevent the instantaneous sending rate from increasing too quickly.

In another embodiment, a three zone classification scheme is disclosed to classify congestion level and the classification scheme based on queuing delay, delay trend, and packet loss. The rate update mechanism may be based upon the zone classification which allows queuing delay to be tightly controlled within some bound.

In another embodiment, aggressive ramp-up and graceful back-off may be implemented to allow for full link utilization when congestion detection thresholds are very low. In one embodiment, packet loss is not used as an input unless accompanied by a delay increase to allow for better operation on lossy (e.g., wireless) links. This can be done so long as congestion detection thresholds are with very high probability less than network router buffer sizes.

Figure 5:
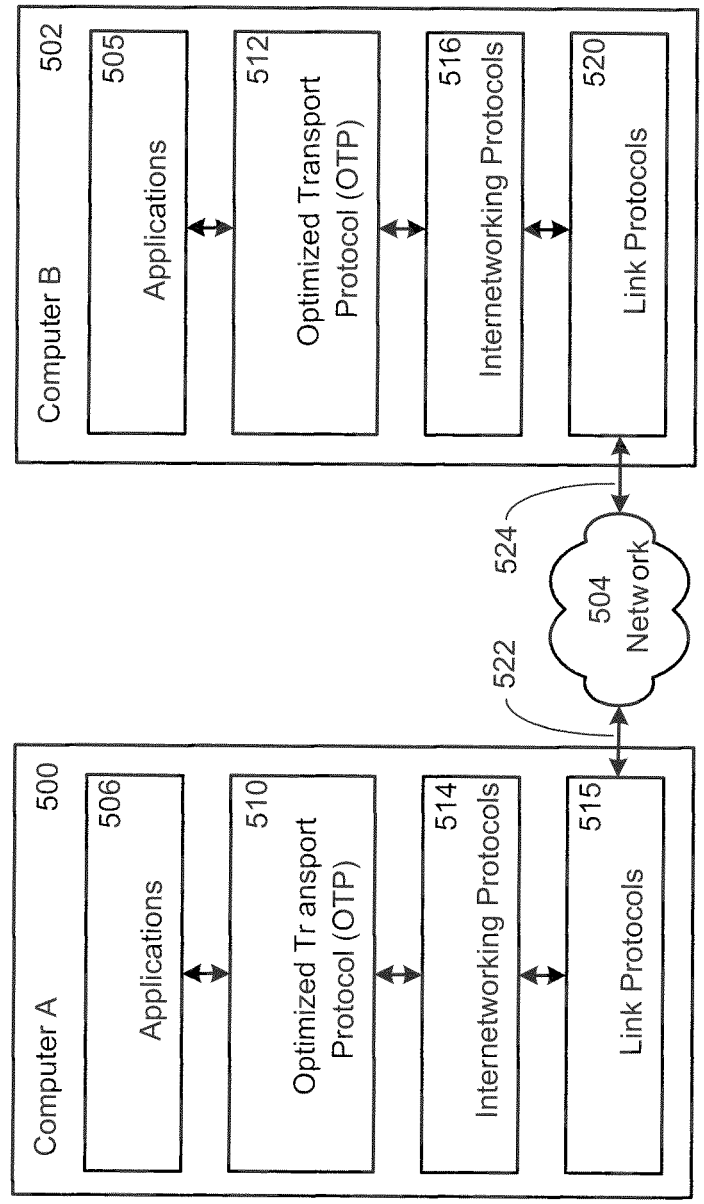
FIG. 5 illustrates an example architecture incorporating aspects of the methods disclosed herein.

Referring to FIG. 5, the transmission of data packets from one computer 500 over the network 504 to another computer 502 can be delayed for a variety of reasons. The network 504 can be inherently "lossy," resulting in transmitted data packets either being lost in the network before they reach their destination, or being corrupted when they reach their destination. Consequently, the lost or corrupted data packets would have to be retransmitted over the network. Exemplary networks which are inherently lossy may include, for example, wireless networks and networks comprising malfunctioning routers. The network 504 can also experience congestion due to bandwidth limitations in the network resulting in data packets having to be queued on the sending computer before an opportunity to transmit them over the network. Significant network congestion can also result in transmitted data packets being lost in the network due to factors such as router queue overruns and the like. These packet transmission delays are exacerbated in situations where the data packets are generated by their source application in a bursty manner.

Existing congestion control protocols are typically window based or delay based. Window based protocols have the advantage that even with the use of aggressive ramp up strategies, the sending rate does not exceed the link capacity by more than 2× at any given moment (since the sender can only send more packets once an ACK or NACK (timeout)). However, since window based protocols can send a full burst of packets at once, some packets suffer a large queuing delay. Thus, the congestion detection thresholds and the actual maximum queuing delay achieved is usually no less than the round-trip time (RTT). For some applications (e.g. VoIP, conferencing, interactive software applications) this may not be tolerable. In addition, if the network router buffers have memory equal to the bandwidth-delay product of the network, such congestion control protocols may produce packet loss (even if they respond to delay signals such as TCP-Vegas or FAST TCP).

Rate based protocols, on the other hand, can directly control the rate of packet transmission. However, care must be taken in not ramping up the rate too aggressively otherwise they can result in oscillatory behavior or even packet loss. As discussed, in one embodiment a hybrid window plus rate based protocol may be implemented. The use of a window provides the advantages of a window based protocol. However, to prevent all packets from going out at once, the packets may be paced using a transmission rate. The use of pacing may result in very low queuing delay (depending on the congestion detection thresholds) and practically zero packet loss.

The use of a low congestion detection threshold may result in potential link under-utilization if the congestion detection threshold (in units of time) is less than the round-trip time (RTT) of the link. For example, the same problem may occur with TCP when network router buffer size (as measured in units of time) is less than the RTT. This may occur in high bandwidth-delay product networks since even a relatively large amount of network router buffer memory (in units of bits) is small in units of time. For example, a 100 Mb buffer with network capacity of 2 Gbps will only be a 100/2000=50 ms buffer. If the link RTT is 100 ms, then this will result in link under-utilization even if the system does not back off until congestion induced packet loss takes place.

If it is assumed that the congestion detection queuing delay thresholds are set in the range of 10-20 ms, then so long as the RTT is larger than the threshold, link under-utilization may occur. One solution is to simply ramp up more aggressively when far from congestion, and reduce the ramp when congestion approaches. Similarly, once congestion is encountered, back off may be less aggressive when congestion is mild, and back off may be more aggressive once congestion level is high. The congestion level is typically found using queuing delay as a metric to determine when congestion may occur.

By considering these factors, full link utilization may be achieved. So long as rate updates are performed using an additive-increase, multiplicative-decrease (AIMD) manner, fairness across multiple flows can also be achieved. In addition, the rate control update may be performed using a three zone scheme. The congestion level may be classified based upon average queuing delay, queuing delay trend, and packet loss. The transmission rate may be updated depending on which zone the protocol is currently in so as to keep queuing delay tightly controlled within some desired bound. Queuing delay may be computed so as to not be sensitive to clock offset or clock skew (aka clock drift).

A goal of a congestion control protocol is to control the transmission rate so that sent packets suffer minimal network queuing delay and loss caused by congestion while sustaining throughput close to the available network bandwidth and ensure fair sharing of network resources. Most congestion control protocols use an additive-increase multiplicative-decrease (AIMD) scheme to adjust the transmission rate (R) or window (W) at the nth time instant using $$W_{n+1} = \begin{cases} W_n + \alpha & \text{if no congestion} \\ W_n(1-\beta) & \text{if congestion} \end{cases} \quad (1)$$

AIMD control schemes have the property that they guarantee fairness regardless of network state. Details of an AIMD scheme include its definitions of congestion, $\alpha$ (amount to additively increase), and $\beta$ (amount to multiplicatively decrease). Congestion may be defined in terms of loss, delay, and explicit congestion notification signals (if present). Thus an AIMD scheme may be used as the base for the congestion control scheme described. The congestion control strategy may be characterized by the following objectives.

Fast adaptation to available bandwidth: Since it is desirable to tolerate small queuing delays (smaller than RTT and buffer size), the function may ramp up quickly to prevent link underutilization.

Sensitive to network delay: To reduce queuing delay and packet loss, the function may use queuing delay as an indicator of congestion to control the rate.

Based on the above objectives, a congestion control function may be provided that is characterized by one or more of the following.

Rate based: Use a combination of rate based plus window based congestion control to introduce packets at a relatively steady rate into the network. This leads to a more steady network behavior in terms of delay which is needed to obtain accurate queuing delay measurements.

Fast ramp up: The function may ramp up aggressively when far from congestion using queuing delay as an indicator of how far the current state is from congestion.

Graceful back off: Instead of backing off by a constant factor when congested, the function may back off based on the level of congestion. When entering congestion, the back-off may not be as aggressive as when heavily congested (as indicated by queuing delay).

Delay constrained congestion detection: The definition of congestion may be modified so that queuing delay can be accurately controlled within some desired range.

The protocol may operate on epochs of length L that are defined to be units of time equal to the estimated round trip propagation time (the minimum RTT seen so far). At the end of each epoch, the epoch length is updated, the congestion level classified into one of three zones as described below, and the transmission rate updated as described below. The window plus rate based rate control is performed as described below.

Instead of simply defining congestion as a binary event (congestion or no congestion), in an embodiment a more continuous definition of congestion level may be used, using both packet loss and one way delay (OWD). An estimate of the current queuing delay may be computed by taking an average of the relative one way delay (ROWD) measurements of all packets which have been acknowledged in the previous epoch which just ended. The relative one-way delay is computed as ROWD=OWD−$OWD_{min}$, where OWD is the actual one-way delay computed as the received time using the receiver's clock minus the sent time using the sender's clock. $OWD_{min}$ is the minimum OWD value seen so far. Although OWD is sensitive to clock offset, ROWD is not since $OWD_{min}$ is an estimate of the propagation delay plus the clock offset. To prevent ROWD measurements from being sensitive to clock drift (where one clock is running faster than the other), $OWD_{mm}$ can be taken to be the minimum over some window of measurements rather than the true minimum seen so far. Let $\delta_{avg}$=avg(ROWD) be the estimate of the queuing delay. The congestion level may be classified into one of the following three zones.

Zone 1: OWD trend is non-increasing and average queuing delay is less than some threshold ($\delta_{avg} \leq d1$).

Zone 2: OWD trend is non-increasing, no packet is lost, and d1<$\delta_{avg}$≤d2, for d2>d1.

Zone 3: OWD trend is increasing, $\delta_{avg}$>d2, or packet loss is accompanied by a delay increase ($\delta_{avg}$>d1).

If packets are being properly paced, an increasing OWD trend means buffers are building up and thus implies congestion. The congestion control protocol strives to stay in Zone 1 and Zone 2 and thus the typical queuing delay seen is between d1 and d2. By appropriately choosing d1 and d2 and accounting for typical propagation delay seen on the link, the end-to-end delay due to the network can be controlled. Delays larger than d2 will only be seen when new flows enter.

TCP uses window based congestion control, in which the window size defines the maximum number of bits that can be outstanding. A protocol implementing window based congestion control is allowed to transmit a packet so long as the number of outstanding bits (F) is less than the window size (W). The outstanding bit count increases whenever a new packet is sent and reduces once the packet is acknowledged (ACK) or once the packet times out (NACK). However, in media streaming applications, rate based congestion control is frequently used. In such applications, the application controls the transmission rate directly. The sender is allowed to send packets at the rate of R bits/second, regardless of the outstanding bit count.

An advantage of window based congestion control is its self-clocking behavior since the sender is not able to increase the sending rate too fast if packets are suffering a large queuing delay (since the outstanding bit count only reduces on ACK or NACK). Windows based congestion control can send out a burst of packets with bursty applications. Though for small bursts, this can result in packets potentially having a lower end-to-end delay since they do not incur pacing delay, for a large burst of packets, some packets can experience a large queuing delay and even packet loss since the instantaneous sending rate can be much larger than the average.

As discussed, window based congestion control may be combined with a rate based congestion control scheme. For example, a window may be used to control the maximum number of outstanding bits, and also control the rate at which packets can enter the network using a transmission rate. The transmission rate R (in bits/sec) is the quantity which is directly adjusted based on congestion signals and a window of size W=RL (in bits) is used to control the maximum number of outstanding bits, where L is the epoch length.

In a pure rate based scheme, if a packet of size P bits is sent, then with a transmission rate of R, the next packet may only be allowed after P/R seconds. In a pure window based scheme, the packet may be sent immediately so long as F<W.

In an embodiment, the packets may be paced but at the same time not exceed the window and thus a joint scheme is used. Suppose packet l of size $P_l$ bits is sent at time $t=T_l$, then we are allowed to send the next packet (l+1) of size $P_{l+1}$ at time t so long as $t>T_l+\gamma P_l/R$ and if F<W, where $\gamma\in[0.0, 1.0]$ is the pacing factor. When $\gamma=1.0$, the congestion control is fully paced and is a joint rate based control with a window. If $\gamma=0.0$, it reverts to the simple window based rate control as in TCP. Once a packet is sent at time t, the number of outstanding bits updates as $F \leftarrow F+P_{l+1}$ and the last sent time is updated $T_{l+1}=t$. Upon ACK or NACK of packet m, the outstanding bit count is reduced, $F \leftarrow F-P_m$.

At the end of every epoch, the transmission rate (R) and window (W) may be updated based on the congestion classification. The direction of change is determined using the zone classification defined above. Instead of updating the window, the transmission rate is directly updated using $$R_{n+1} = \begin{cases} R_n + \alpha & \text{if Zone = Zone 1} \\ R_n(1-\beta) & \text{if Zone = Zone 2 or Zone 3} \end{cases},$$

where $$\alpha = \begin{cases} \alpha_{max} & \text{if } \delta_{avg} \leq d_0 \\ \dfrac{\alpha_{min}\alpha_{max}(d_1-d_0)}{\alpha_{max}(\delta_{avg}-d_0)+\alpha_{min}(d_1-\delta_{avg})} & \text{else.} \end{cases}$$

$\alpha=\alpha_{max}$ for $\delta_{avg} \leq d_0$ and decays to $\alpha=\alpha_{min}$ by the Zone 1 boundary $d_1$. $\beta$ is given by the following if no packet loss is encountered:

$$\beta = \begin{cases} \beta_{min} + \dfrac{\beta_{mid}-\beta_{min}}{d_2-d_1}(\delta_{avg}-d_1) & \text{if Zone = Zone 2,} \\ \beta_{min} + \dfrac{\beta_{max}-\beta_{mid}}{d_3-d_2}(\delta_{avg}-d_2) & \text{if Zone = Zone 3 \&} \\ & OWD \text{ non-increasing \&} \\ & \delta_{avg} \leq d_3, \\ \beta_{min} + \dfrac{\beta_{max}-\beta_{min}}{d_3}\delta_{avg} & \text{if } OWD \text{ increasing \&} \\ & \delta_{avg} \leq d_3, \\ \beta_{max} & \text{if } \delta_{avg} > d_3, \end{cases}$$

where $\beta_{min}$, $\beta_{mid}$, and $\beta_{max}$ are used to control the shape of the curve $\beta$ goes from $\beta_{min}$ to $\beta_{mid}$ during Zone 2, and then up to $\beta_{max}$ in Zone 3 if the delay trend is non-increasing. If the delay trend is increasing, then it is assumed to be a sign of congestion and $\beta$ linearly increases as a function of delay up to $\beta_{max}$ regardless of queuing delay. For cases where packet loss is encountered and $\beta_{avg}>d_1$, $\beta=\beta_{max}$.

A method for computing queuing delay which is insensitive to clock offset and clock drift is now described. Suppose the sender records packet "n" as leaving the sender at time "s" using the sender clock and then the receiver records the time the packet is received as "r" using the receiver clock. The receiver sends back this information (time received) to the sender. The sender then can compute packet "n" as having a one-way delay (OWD=r–s). OWD includes network propagation delay, network queuing delay as well as clock offset between receiver and sender. Since the propagation delay is assumed to be a constant (p), and if it is assumed that the clock offset is a constant (c), and if it is assumed that the minimum OWD seen so far (OWD_{min}) is from the state when queuing delay was zero, then we can compute the relative one-way delay and assume it to be the queuing delay (call it q) as ROWD=OWD–OWD_{min} (since q=(p+c+q)–(p+c)). However, if the protocol is running for a long time, the clock drift can become significant (i.e. c is not a constant but changes over time.

In one embodiment, a method can keep track of two minimum OWD values (OWD_{min1} and OWD_{min2}). Let OWD_{min1} be the minimum OWD seen from some time "t1" to the current time (call it t). Thus OWD_{min1} is easy to compute since it just involves an update of the form: OWD_{min1}:=min(OWD_{min1}, r–s). Let OWD_{min2} be the minimum OWD seen from some other time "t2" (where t2>t1) to the current time. The method may use ROWD=OWD–OWD_{min1} until the current time "t" exceeds some threshold (call it t3). Until t3 we use the value OWD_{min1} as the base. At t3, the method can switch to using OWD_{min2} as the base (i.e. ROWD=OWD–OWD_{min2}) and then set OWD_{min1} to be the current value. The method may keep updating both OWD_{min1} and OWD_{min2} and alternate between using one or the other as the base. This is done as shown in FIG. 12.

Figure 9:
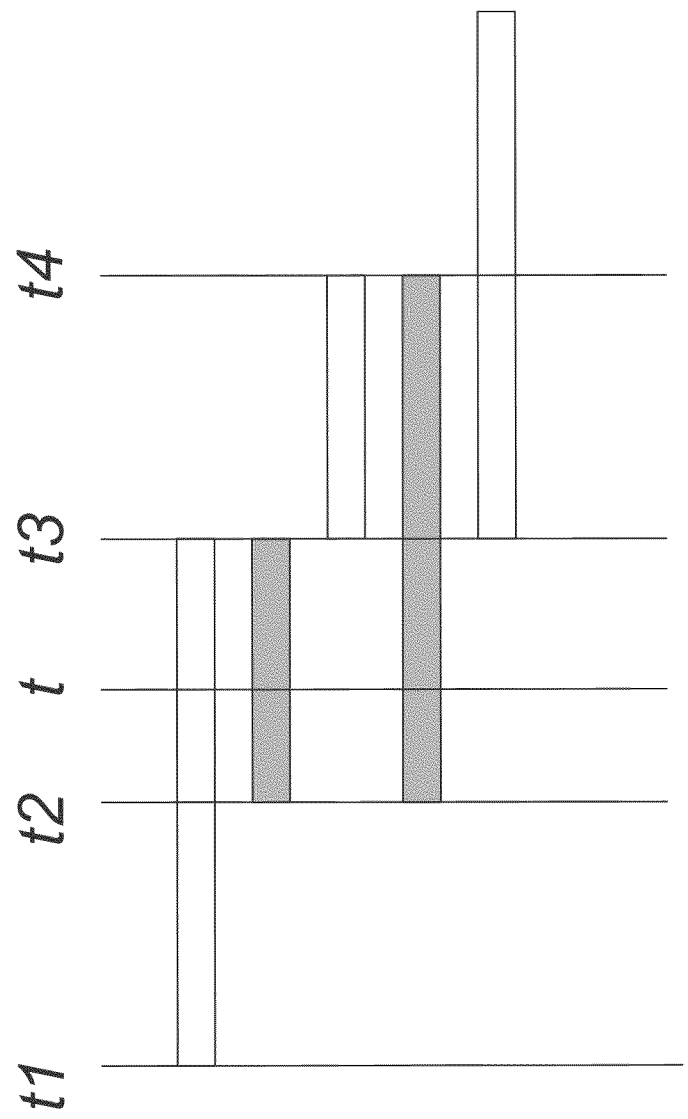
FIG. 9 illustrates a timing diagram illustrating an embodiment disclosed herein.

Referring to FIG. 9, the white bars indicate OWD_{min1} and the gray bars indicate computation of OWD_{min2}. From time t2 to time t3, OWD_{min1} which is being computed as minimum from t1 to the current time is used as the base to compute ROWD. During this time, OWD_{min1} is the minimum of (t2–t1) up to (t3–t1) seconds of samples. Then OWD_{min1} is reset at time t3. However, by this time, OWD_{min2} is the minimum of (t3–t2) seconds of samples and thus it is used as the base until t4. For example, suppose t1=0, t2=30, t3=60, and t4=90. Then, the base being used is the minimum of at least 30 seconds of samples and no more than the minimum of 60 seconds of samples. Thus in this example, if clock drift is sufficiently slow so that the clock offset is approximately constant over a duration of 30 seconds, and if we are able to get at least one measurement of RTT during minimal congestion over a period of 30 seconds, then the queuing delay measurement will not be affected by clock offset or clock drift. In practice, such assumptions are usually correct.

Figure 6:
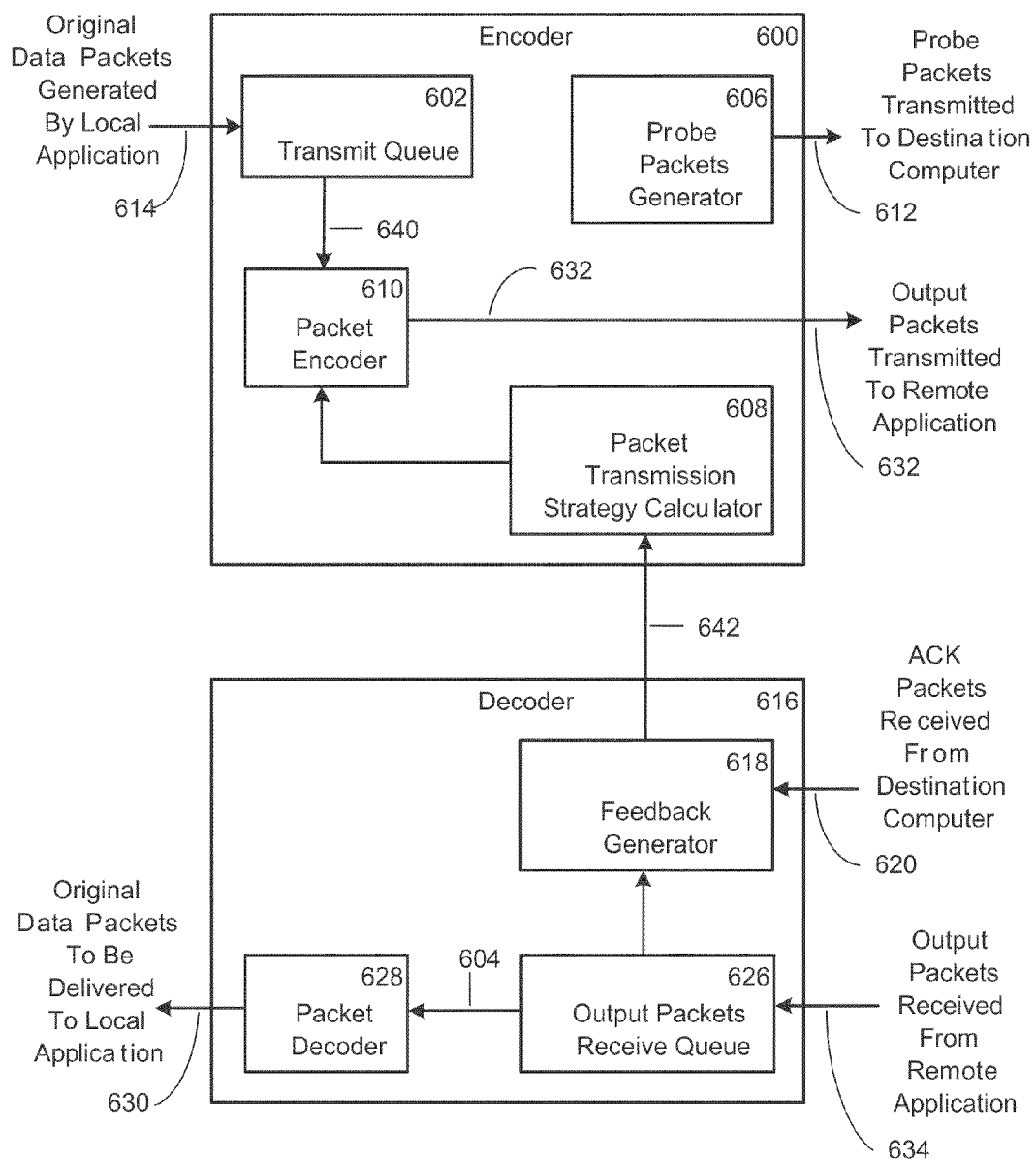
FIG. 6 illustrates an example architecture incorporating aspects of the methods disclosed herein.

FIG. 6 illustrates an exemplary embodiment of an encoder/decoder architecture. As shown in FIG. 6, original data packets generated by a local application 614 (which are destined for a remote application) are input to an encoder 600. Each input original packet 614 is temporarily stored in a transmit queue 602. Upon each transmission opportunity, a packet transmission strategy calculator 608 uses feedback 642 it receives from a decoder 616 to compute a variety of parameters representing the current state of the network. In one embodiment, these network state parameters may comprise the network's currently available bandwidth, current packet loss rate, current packet transmission delay and current router queue size. The packet transmission calculator 608 may use these network state parameters to dynamically compute the packet transmission flow control strategy. The packet transmission strategy calculator 608 may also maintain a history of previous network states which can also be used in the computation of these strategies.

Referring again to FIG. 6, when a new communications session is established between the local application and the remote application, the network's currently available bandwidth may be measured. The network's currently available bandwidth may be measured by transmitting a sequence of specialized, low overhead probe packets 612 (it is noted that these are not data packets) over the network to the destination computer, where these probe packets were generated by a probe packets generator 606. It is noted that alternate embodiments are also possible wherein the network's currently available bandwidth may be measured or estimated using other known methods.

Once the packet encoding strategy has been calculated 608 for a given transmission opportunity, then based on this strategy the packet encoder 610 may read 640 one or more original packets from the transmit queue 602 and form an output packet 632 from the original packets, where the output packet is subsequently transmitted over the network to the remote application.

Output packets that are received over the network from the remote application 634 may be input to the decoder 616. Each received output packet 634 may be temporarily stored in an output packets receive queue 626. The received output packets may then be read 604 from the output packets receive queue 626 in a first-in first-out manner and are input to a packet decoder 628. The packet decoder 628 may attempt to decode each received output packet and extract the one or more original packets included therein. Original packets which are successfully extracted 630 may subsequently be delivered to the local application.

When the destination computer successfully receives a particular output packet 632 that was transmitted over the network from the source computer, the destination computer may transmit an acknowledgement (ACK) packet 620 over the network back to the source computer. The ACK packet 620 may indicate that the particular output packet 632 was successfully received by the destination computer. The ACK packet 620 may also indicate that the particular output packet 632 is considered lost since a later output packet 632 was successfully received by the destination computer. The ACK packet 620 can also indicate if the particular output packet 632 was received out of order. ACK packets that are received over the network from the destination computer 620 are input to a feedback generator 618. The feedback generator 618 processes the ACK packets to routinely compute the round-trip time and a one-way packet transmission delay indicator at a prescribed interval, where this delay indicator specifies if the one-way packet transmission delay is increasing, decreasing or unchanged. The feedback generator 618 maintains a history of computed round-trip times and delay indicators, and also routinely computes (at the prescribed interval) a median round-trip time over a prescribed congestion window. The feedback generator 618 provides the ACK packets, the computed round-trip times, the computed delay indicators, and the computed median round-trip times to the packet transmission strategy calculator 608 as part of the aforementioned feedback 642.

Figure 7:
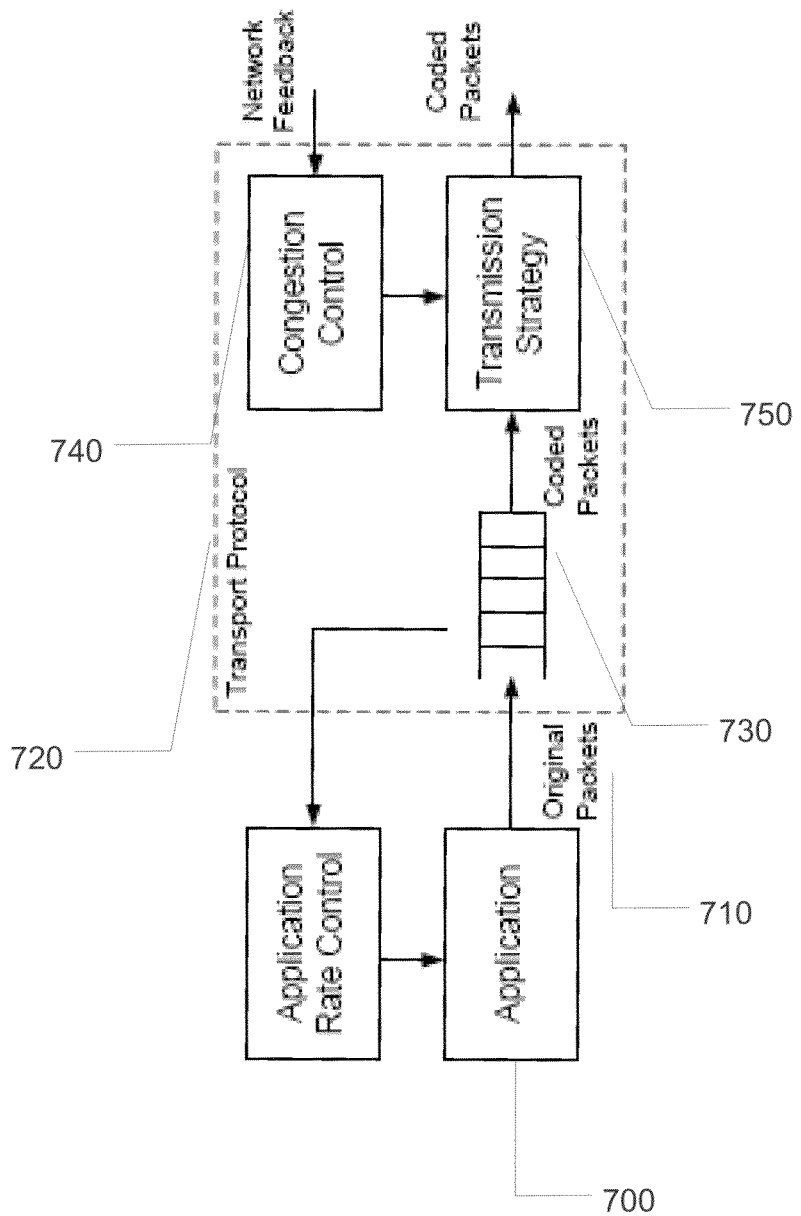
FIG. 7 illustrates an example architecture incorporating aspects of the methods disclosed herein.

FIG. 7 illustrates a block diagram of a typical network setup of interactive applications. The sender application 700 produces original source packets 710 to send to the receiver. These packets typically come in a burst and consist of data which the receiver will process in order. The packets are sent to the transport module 720. The transport module typically has a buffer 730 to temporarily hold the packets. The packets leave the buffer only when they have been acknowledged by the receiver. If the sending buffer is full, the sending application receives feedback of this event from the transport module and reduces its sending rate. For example, for an application that is sending audio/video, it can re-compress the audio/video at a lower bit rate. For game applications, it can reduce the game status update interval to reduce the sending rate. However, once the packets enter the transport module's buffer, they must be delivered losslessly to the receiver.

The transport function may comprise a congestion control component 740 that estimates the available bandwidth in the communications channel, determines the current sending rate, and backs off (reduces sending rate) when congestion is detected. The congestion control component may find a fair share of the bandwidth for the sending application while trying to minimize self congestion induced loss and queuing delay. Additionally and optionally, the transport function may comprise a second component which may be a transmission strategy component 750 that determines which type of packet to send at each transmission opportunity.

Figure 8:
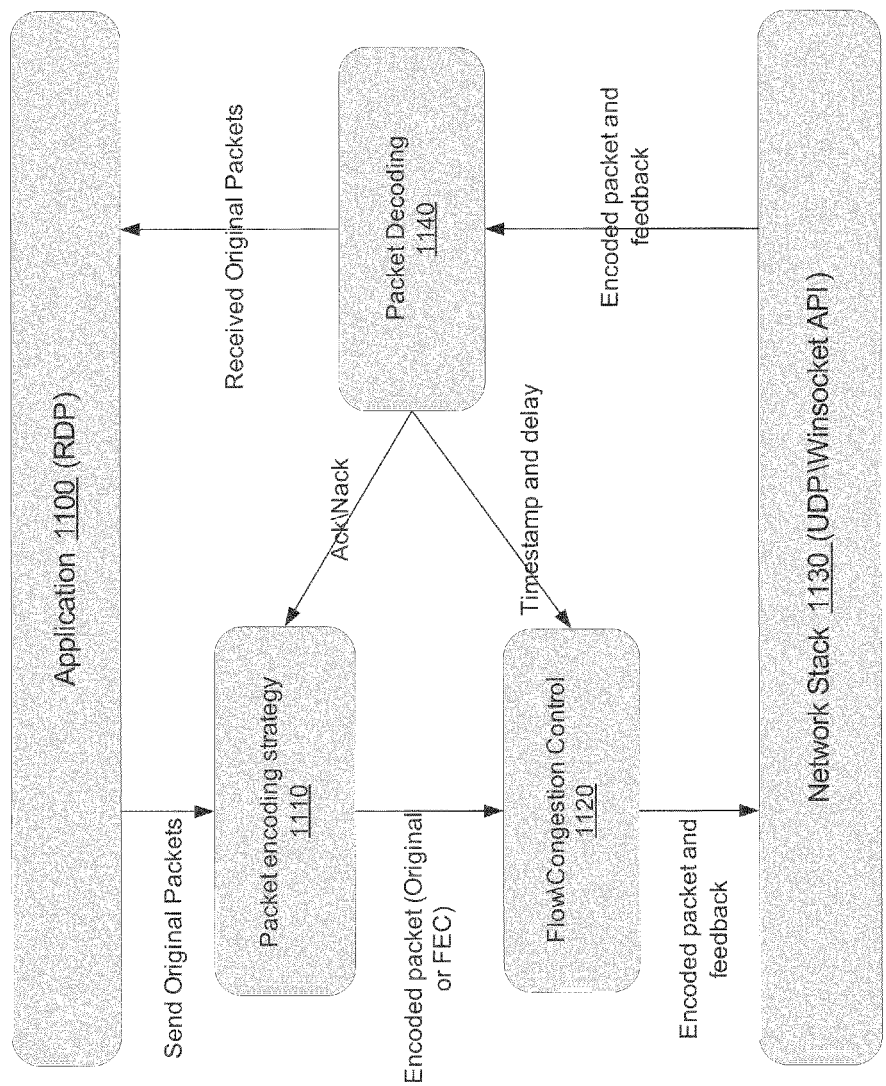
FIG. 8 illustrates an example architecture incorporating aspects of the methods disclosed herein.

FIG. 8 illustrates an example of a functional block diagram illustrating some of the methods disclosed herein. The sender application 800 produces original source packets to send to the receiver. A packet encoding strategy 810 may be provided that determines which type of packet to send at each transmission opportunity. A congestion control component 820 may be provided that estimates the available bandwidth in the communications channel, determines the current sending rate, and backs off (reduces sending rate) when congestion is detected. The encoded packet may be sent to the network stack 830 for sending to the client, where the packets may be decoded using a packet decoding function 840 and provided to the corresponding application 800 at the client.

Figure 10:
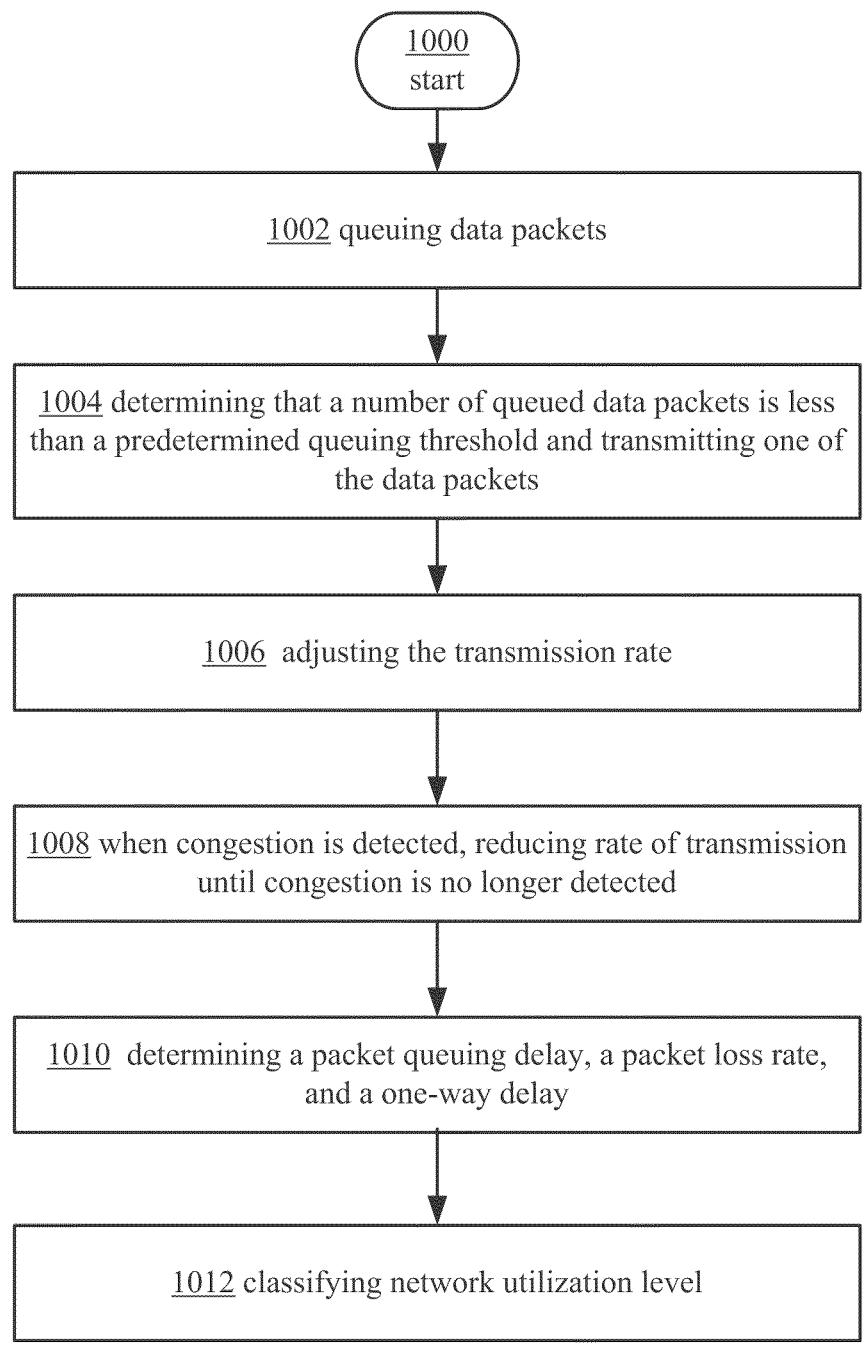
FIG. 10 illustrates an example procedure transmitting data over a communications network, incorporating aspects of the disclosure.

FIG. 10 depicts an exemplary operational procedure for transmitting data over a communications network in accordance with the disclosed embodiments. Operation 1002 illustrates queuing data packets for transmission over the communications network. Operation 1004 illustrates determining that a number of queued data packets is less than a predetermined queuing threshold and transmitting one of the data packets. In an embodiment, the predetermined queuing threshold indicates a maximum quantity of data that can be queued and not transmitted over the communications network. Operation 1006 illustrates adjusting the transmission rate of the data packets based upon a congestion level of the communications network.

In various embodiments, the congestion level may be determined as a function of a packet queuing delay. In one embodiment, the congestion level may be determined as a function of a packet queuing delay, packet loss rate, and one way delay (OWD) trend. Additionally and optionally, the packet queuing delay, packet loss rate, and OWD trend may be estimated based on acknowledgment packets. In one embodiment, the packet queuing delay may be computed by taking an average of the relative one way delay (ROWD) measurements of packets that have been acknowledged during a predetermined time interval. The predetermined time interval may comprise a unit of time corresponding to the estimated round trip propagation time of the communications network. 10. The ROWD may be computed as ROWD=OWD−OWDmin, wherein OWD is the actual one-way delay computed as a received time using a receiver's clock minus the sent time using a sender's clock, and OWDmin is the minimum observed OWD value.

In another embodiment, the packet queuing delay and said OWD trend may be estimated based on a round-trip time (RTT) and a OWD, and the packet loss rate may be estimated by computing the number of packets lost during a sliding window to compute an estimate of the current loss rate, and by smoothing the estimated current loss rate using an exponential weighted moving average of the current loss rate to obtain an estimate of the probability of loss rate. Packets may be declared to be lost when no acknowledgement is received within a retransmission time-out (RTO) that is computed using RTT and the variance in RTT (RTTVAR).

In one embodiment, the packet queuing delay may be computed using ROWD=OWD−OWD_{min1} until T exceeds a predetermined threshold 13, whereupon ROWD=OWD−OWD_{min2}) and OWD_{min1} is set to the previous value of ROWD, wherein OWD_{min1} is the minimum observed OWD from time "t1" to the current time T, and OWD_{min2} is the minimum observed OWD from time "t2" (where t2>t1) to T.

In an embodiment, the average of the relative one way delay may be determined using a difference between an actual, OWD and a minimum OWD measured over a predetermined number of OWD values, and the OWD may be the difference between a packet received time using a receiver clock and a sent time using a sender clock.

The adjusting of the transmission rate may further comprise transmitting the queued data packets and increasing the rate of transmission until congestion is detected. Additionally and optionally, when congestion is detected, the rate of transmission may be reduced until congestion is no longer detected.

In an embodiment, network utilization levels may be classified into one of three zones:

Zone 1: OWD is not increasing and the average packet queuing delay is less than a predetermined delay threshold, Zone 2: OWD is not increasing, packet loss is below a predetermined loss threshold, and the average queuing delay is greater than the predetermined delay threshold but less than an upper threshold, and Zone 3: OWD is increasing, the average queuing delay is greater than the upper threshold or packet loss above a packet loss threshold is accompanied by average queuing delay above a queuing delay threshold.

In one embodiment, the transmission rate ($R_n$) is updated using the current zone classification, the current average packet queuing delay estimate ($\delta_{avg}$), packet loss, and OWD trend (increasing or non-increasing), using $$R_{n+1} = \begin{cases} R_n + \alpha & \text{if Zone = Zone 1} \\ R_n(1-\beta) & \text{if Zone = Zone 2 or Zone 3} \end{cases},$$

where $$\alpha = \begin{cases} \alpha_{max} & \text{if } \delta_{avg} \leq d_0 \\ \dfrac{\alpha_{min}\alpha_{max}(d_1 - d_0)}{\alpha_{max}(\delta_{avg} - d_0) + \alpha_{min}(d_1 - \delta_{avg})} & \text{else.} \end{cases}$$

wherein $\alpha=\alpha_{max}$ for $\delta_{avg} \leq d_0$ and decays to $\alpha=\alpha_{min}$ by the Zone 1 boundary $d_1$, and $\beta$ is given by the following when no packet loss is encountered:

$$\beta = \begin{cases} \beta_{min} + \dfrac{\beta_{mid} - \beta_{min}}{d_2 - d_1}(\delta_{avg} - d_1) & \text{if Zone = Zone 2,} \\ \beta_{min} + \dfrac{\beta_{max} - \beta_{mid}}{d_3 - d_2}(\delta_{avg} - d_2) & \text{if Zone = Zone 3 \&} \\ & \text{OWD non-increasing \&} \\ & \delta_{avg} \leq d_3, \\ \beta_{min} + \dfrac{\beta_{max} - \beta_{min}}{d_3}\delta_{avg} & \text{if OWD increasing \&} \\ & \delta_{avg} \leq d_3, \\ \beta_{max} & \text{if } \delta_{avg} > d_3. \end{cases}$$

for cases where packet loss is encountered and $\delta avg > d1$, $\beta = \beta max$.

In an embodiment, the transmission rate may be increased when the congestion level is in zone 1, the transmission rate may be reduced when the congestion level is in zone 2 or zone 3, and the transmission rate may be reduced at a greater rate in zone 3 than in zone 2.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable, computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed:

1. A method for transmitting data over a communications network, the method comprising:
   queuing data packets for transmission over the communications network;
   determining that a number of queued data packets is less than a predetermined queuing threshold and transmitting one of the data packets, wherein the predetermined queuing threshold indicates a maximum quantity of data that can be queued and not transmitted over the communications network; and
   adjusting the transmission rate of the data packets based upon a congestion level of the communications network, the congestion level based at least in part on received acknowledgement of the transmitted data packets and determined as a function of a packet queuing delay, packet loss rate, and one way delay (OWD) trend estimated based on acknowledgement packets.

2. The method of claim 1, wherein the congestion level is determined as a function of a packet queuing delay.

3. The method of claim 2, wherein the packet queuing delay is computed by taking an average of the relative one way delay (ROWD) measurements of packets that have been acknowledged during a predetermined time interval.

4. The method of claim 1, wherein said adjusting further comprises transmitting the queued data packets and increasing the rate of transmission until congestion is detected.

5. The method of claim 4, further comprising:
when said congestion is detected, reducing said rate of transmission until said congestion is no longer detected.

6. The method of claim 1, wherein said packet queuing delay and said OWD trend are estimated based on a round-trip time (RTT) and a OWD, and said packet loss rate is estimated by:
computing a number of packets lost during a sliding window to compute an estimate of the current loss rate; and
smoothing the estimated current loss rate using an exponential weighted moving average of the current loss rate to obtain an estimate of the probability of loss rate, wherein packets are declared to be lost when no acknowledgement is received within a retransmission time-out (RTO) that is computed using RTT and the variance in RTT (RTTVAR).

7. The method of claim 3, wherein the predetermined time interval comprises a unit of time corresponding to the estimated round trip propagation time of the communications network.

8. The method of claim 3, wherein the ROWD is computed as ROWD=OWD−$OWD_{min}$, wherein OWD is the actual one-way delay computed as a received time using a receiver's clock minus the sent time using a sender's clock, and $OWD_{min}$ is the minimum observed OWD value.

9. The method of claim 1, further comprising:
classifying network utilization level into one of three zones:
Zone 1: OWD is not increasing and the average packet queuing delay is less than a predetermined delay threshold,
Zone 2: OWD is not increasing, packet loss is below a predetermined loss threshold, and the average queuing delay is greater than the predetermined delay threshold but less than an upper threshold, and
Zone 3: OWD is increasing, the average queuing delay is greater than the upper threshold or packet loss above a packet loss threshold is accompanied by average queuing delay above a queuing delay threshold.

10. The method of claim 9, wherein the transmission rate ($R_n$) is updated using the current zone classification, the current average packet queuing delay estimate ($\delta_{avg}$), packet loss, and OWD trend (increasing or non-increasing), using $$R_{n+1} = \begin{cases} R_n + \alpha & \text{if Zone = Zone 1} \\ R_n(1-\beta) & \text{if Zone = Zone 2 or Zone 3} \end{cases},$$

where $$\alpha = \begin{cases} \alpha_{max} & \text{if } \delta_{avg} \leq d_0 \\ \dfrac{\alpha_{min}\alpha_{max}(d_1-d_0)}{\alpha_{max}(\delta_{avg}-d_0)+\alpha_{min}(d_1-\delta_{avg})} & \text{else.} \end{cases}$$

wherein $\alpha=\alpha_{max}$ for $\delta_{avg} \leq d_0$ and decays to $\alpha=\alpha_{min}$ by the Zone 1 boundary $d_1$, and $\beta$ is given by the following when packet loss is below a predetermined loss threshold:

$$\beta = \begin{cases} \beta_{min} + \dfrac{\beta_{mid}-\beta_{min}}{d_2-d_1}(\delta_{avg}-d_1) & \text{if Zone = Zone 2,} \\ \beta_{min} + \dfrac{\beta_{max}-\beta_{mid}}{d_3-d_2}(\delta_{avg}-d_2) & \text{if Zone = Zone 3 \& OWD non-increasing \& } \delta_{avg} \leq d_3, \\ \beta_{min} + \dfrac{\beta_{max}-\beta_{min}}{d_3}\delta_{avg} & \text{if OWD increasing \& } \delta_{avg} \leq d_3, \\ \beta_{max} & \text{if } \delta_{avg} > d_3 \end{cases}$$

for cases where packet loss is encountered and $\delta_{avg} > d_1$, $\beta=\beta_{max}$.

11. The method of claim 10, wherein the transmission rate is increased when the congestion level is in zone 1, the transmission rate is reduced when the congestion level is in zone 2 or zone 3, and the transmission rate is reduced at a greater rate in zone 3 than in zone 2.

12. The method of claim 2, wherein the packet queuing delay is computed using ROWD=OWD−OWD_{min1} until T exceeds a predetermined threshold t3, whereupon ROWD=OWD−OWD_{min2}) and OWD_{min1} is set to the previous value of ROWD, wherein OWD_{min1} is the minimum observed OWD from time "t1" to the current time T, and OWD_{min2} is the minimum observed OWD from time "t2" (where t2>t 1 ) to T.

13. The method of claim 3, wherein the average of the relative one way delay is determined using a difference between an actual OWD and a minimum OWD measured over a predetermined number of OWD values, and the OWD is a difference between a packet received time using a receiver clock and a sent time using a sender clock.

14. A system configured to transmit data over a communications network, comprising:
at least one processor; and
at least one memory communicatively coupled to said at least one processor when the system is operational, the memory having stored therein computer-executable instructions that, upon execution by the processor, cause:
queuing data packets for transmission over the communications network;
determining that a number of queued data packets is less than a predetermined queuing threshold and transmitting one of the data packets, wherein the predetermined queuing threshold indicates a maximum quantity of data that can be queued and not transmitted over the communications network;
increasing a rate of transmission until congestion is detected, the congestion detected as a function of packet queuing delay, packet loss rate, and one-way delay (OWD) trend and based at least in part on received acknowledgement of the transmitted data packets; and
reducing said rate of transmission until said congestion is no longer detected;
wherein the transmission rate ($R_n$) is updated using the OWD trend, packet loss, the current average packet queuing delay estimate ($\delta_{avg}$), and the current zone classification which is based on the current average packet queuing delay estimate ($\delta_{avg}$), packet loss, and OWD trend, using $$R_{n+1} = \begin{cases} R_n + \alpha & \text{if Zone = Zone 1} \\ R_n(1-\beta) & \text{if Zone = Zone 2 or Zone 3} \end{cases},$$

where $$\alpha = \begin{cases} \alpha_{max} & \text{if } \delta_{avg} \leq d_0 \\ \dfrac{\alpha_{min}\alpha_{max}(d_1-d_0)}{\alpha_{max}(\delta_{avg}-d_0)+\alpha_{min}(d_1-\delta_{avg})} & \text{else,} \end{cases}$$

wherein $\alpha = \alpha_{max}$ for $\delta_{avg} \leq d_0$ and decays to $\alpha = \alpha_{min}$ by the Zone 1 boundary $d_1$, $\beta$ is given by the following when packet loss is below a predetermined loss threshold:

$$\beta = \begin{cases} \beta_{min} + \dfrac{\beta_{mid}-\beta_{min}}{d_2-d_1}(\delta_{avg}-d_1) & \text{if Zone = Zone 2,} \\ \beta_{min} + \dfrac{\beta_{max}-\beta_{mid}}{d_3-d_2}(\delta_{avg}-d_2) & \text{if Zone = Zone 3 \&} \\ & \text{OWD non-increasing \&} \\ & \delta_{avg} \leq d_3, \\ \beta_{min} + \dfrac{\beta_{max}-\beta_{min}}{d_3}\delta_{avg} & \text{if OWD increasing \&} \\ & \delta_{avg} \leq d_3, \\ \beta_{max} & \text{if } \delta_{avg} > d_3 \end{cases}$$

for cases where packet loss is encountered and $\delta_{avg} > d_1$, $\beta = \beta_{max}$.

15. The system of claim 14, further comprising classifying network utilization level into one of three zones:

(1) OWD is not increasing and the average packet queuing delay is less than a predetermined delay threshold, (2) OWD is not increasing, packet loss is below a predetermined loss threshold, and the average queuing delay is greater than the predetermined delay threshold but less than an upper threshold, and (3) OWD is increasing, the average queuing delay is greater than the upper threshold or packet loss above a packet loss threshold is accompanied by average queuing delay above a queuing delay threshold, wherein the transmission rate is increased when the congestion level is in zone 1, the transmission rate is reduced when the congestion level is in zone 2 or zone 3, and the transmission rate is reduced at a greater rate in zone 3 than in zone 2.

16. A computer readable storage device storing thereon computer executable instructions, said instructions comprising:

instructions for queuing data packets for transmission over the communications network;

instructions for determining that a number of queued data packets is less than a predetermined queuing threshold and transmitting one of the data packets, wherein the predetermined queuing threshold indicates a maximum quantity of data that can be queued and not transmitted over the communications network;

instructions for increasing a rate of transmission until congestion is detected, the congestion detected as a function of packet queuing delay, packet loss rate, and one-way delay (OWD) trend;

instructions for reducing said rate of transmission until said congestion is no longer detected; and instructions for classifying network utilization level into one of three zones:

(1) OWD is not increasing and the average packet queuing delay is less than a predetermined delay threshold, (2) OWD is not increasing, packet loss is below a predetermined loss threshold, and the average queuing delay is greater than the predetermined delay threshold but less than an upper threshold, and (3) OWD is increasing, the average queuing delay is greater than the upper threshold or packet loss above a packet loss threshold is accompanied by average queuing delay above a queuing delay threshold, wherein the transmission rate is increased when the congestion level is in zone 1, the transmission rate is reduced when the congestion level is in zone 2 or zone 3, and the transmission rate is reduced at a greater rate in zone 3 than in zone 2;

wherein:

the congestion is determined as a function of a packet queuing delay, packet loss rate, and OWD trend, and the transmission rate ($R_n$) is updated using the current zone classification, the current average packet queuing delay estimate ($\delta_{avg}$), packet loss, and OWD trend (increasing or non-increasing), using $$R_{n+1} = \begin{cases} R_n + \alpha & \text{if Zone = Zone 1} \\ R_n(1-\beta) & \text{if Zone = Zone 2 or Zone 3} \end{cases},$$

where $$\alpha = \begin{cases} \alpha_{max} & \text{if } \delta_{avg} \leq d_0 \\ \dfrac{\alpha_{min}\alpha_{max}(d_1-d_0)}{\alpha_{max}(\delta_{avg}-d_0)+\alpha_{min}(d_1-\delta_{avg})} & \text{else.} \end{cases}$$

where $\alpha = \alpha_{max}$ for $\delta_{avg} \leq d_0$ and decays a $\alpha = \alpha_{min}$ by the Zone 1 boundary $d_1$, $\beta$ is given by the following when no packet loss is encountered:

$$\beta = \begin{cases} \beta_{min} + \dfrac{\beta_{mid}-\beta_{min}}{d_2-d_1}(\delta_{avg}-d_1) & \text{if Zone = Zone 2,} \\ \beta_{min} + \dfrac{\beta_{max}-\beta_{mid}}{d_3-d_2}(\delta_{avg}-d_2) & \text{if Zone = Zone 3 \&} \\ & \text{OWD non-increasing \&} \\ & \delta_{avg} \leq d_3, \\ \beta_{min} + \dfrac{\beta_{max}-\beta_{min}}{d_3}\delta_{avg} & \text{if OWD increasing \&} \\ & \delta_{avg} \leq d_3, \\ \beta_{max} & \text{if } \delta_{avg} > d_3 \end{cases}$$

for cases where packet loss is encountered and $\delta_{avg} > d_1$, $\beta = \beta_{max}$.

17. The method of claim 1, further comprising computing a number of packets lost during a sliding window to compute an estimate of the current loss rate, wherein the sliding window has a size based on a transmission rate and an epoch length.

18. The method of claim 17, wherein the epoch length is based on an estimated round trip propagation time.

19. The method of claim 18, wherein, following each epoch, the epoch length is updated and the congestion level is classified into one of a plurality of zones.

* * * * *